United States Patent
Jung et al.

(10) Patent No.: US 7,634,327 B2
(45) Date of Patent: Dec. 15, 2009

(54) DECOUPLED SYNCHRO-DRIVE ROBOT BASE

(75) Inventors: Ui-Jung Jung, Daejeon (KR); Goon Ho Choi, Daejeon (KR); Byung Soo Kim, Daejeon (KR)

(73) Assignee: Hanool Robotics Corp, Daejeon (KR)

( * ) Notice: Subject to any disclaimer, the term of this patent is extended or adjusted under 35 U.S.C. 154(b) by 568 days.

(21) Appl. No.: 10/559,790

(22) PCT Filed: Jun. 7, 2004

(86) PCT No.: PCT/KR2004/001360

§ 371 (c)(1), (2), (4) Date: Dec. 8, 2005

(87) PCT Pub. No.: WO2004/109158

PCT Pub. Date: Dec. 16, 2004

(65) Prior Publication Data

US 2007/0100497 A1    May 3, 2007

(30) Foreign Application Priority Data

Jun. 9, 2003    (KR) .............. 10-2003-0036649

(51) Int. Cl.
*G06F 19/00* (2006.01)

(52) U.S. Cl. ............ 700/245; 700/90; 700/213; 318/568.1; 318/568.12; 318/568.17

(58) Field of Classification Search ............ 700/245; 180/12, 23, 252, 6.48
See application file for complete search history.

(56) References Cited

U.S. PATENT DOCUMENTS

| | | | |
|---|---|---|---|
| 4,158,986 A * | 6/1979 | Appelblatt et al. | 89/36.08 |
| 4,527,458 A * | 7/1985 | Johnson | 89/41.01 |
| 4,657,104 A | 4/1987 | Holland | |
| 4,683,973 A | 8/1987 | Honjo et al. | |
| 4,733,737 A | 3/1988 | Falamak | |
| 4,932,489 A | 6/1990 | Evans et al. | |
| 6,113,343 A * | 9/2000 | Goldenberg et al. | 414/729 |
| 6,145,611 A * | 11/2000 | Haddad, Sr. | 180/12 |
| 6,354,530 B1 * | 3/2002 | Byrne et al. | 242/533.5 |
| 6,459,955 B1 * | 10/2002 | Bartsch et al. | 700/245 |

(Continued)

*Primary Examiner*—Khoi Tran
*Assistant Examiner*—Jonathan Sample
(74) *Attorney, Agent, or Firm*—Arent Fox LLP

(57) ABSTRACT

The present invention provides a synchro-drive mobile robot base which allows a robot to accomplish a 360° endless rotation through a triple shaft mechanism, while a turret, a steering unit and a drive unit are decoupled from each other. The mobile robot base includes the turret (34) having thereon a turret motor (33), a drive motor (29) and a steering motor (19); the steering unit (10) which has a differential gear unit and transmits an actuating force generated from the steering motor (29) to a wheel case (41); a drive unit (20) which has a differential gear unit and transmits an actuating force generated from the drive motor (29) to the wheel (42); and a turret rotating unit (30) which transmits an actuating force generated from the turret motor (33) to the turret (34). A part of the differential gear unit of the drive unit (20) is coupled to the steering unit (10), while a part of the differential gear unit of the steering unit (10) is coupled to the turret rotating unit (30), so that the drive motor (29), the steering motor (19) and the turret motor (33) are decoupled from each other.

8 Claims, 3 Drawing Sheets

U.S. PATENT DOCUMENTS

| | | | |
|---|---|---|---|
| 6,477,918 B2 * | 11/2002 | Sakamoto | 74/640 |
| 6,491,127 B1 * | 12/2002 | Holmberg et al. | 180/252 |
| 6,948,576 B2 * | 9/2005 | Angeles | 180/23 |
| 7,328,759 B2 * | 2/2008 | Jung et al. | 180/6.48 |
| 2006/0175099 A1 * | 8/2006 | Jung et al. | 180/6.48 |

* cited by examiner

DECOUPLED SYNCHRO-DRIVE ROBOT BASE

CROSS-REFERENCE TO RELATED APPLICATION

This application is a National Stage entry of International Application Number PCT/KR2004/001360, filed Jun. 7, 2004. The disclosure of the prior application is hereby incorporated herein in its entirety by reference.

1. Technical Field

The present invention relates, in general, to synchro-drive mobile robot bases and, more particularly, to a synchro-drive mobile robot base, in which a rotation of a turret, a driving of a mobile robot, and a determination of a direction of the movement of the mobile robot are respectively and independently controlled by a plurality of motors.

2. Background Art

Generally, robots have been used in various places of works of persons that are not safe, impossible or inefficient. In addition, conventional robots have been used in repetitive works, or works that require high-level accuracy to increase productivity and quality of products. The conventional robots have been developed for a variety of fields, such as for research, home use and crime prevention as well as various industrial fields. Therefore, recently, it is required that each of actuating units of the robots is operated within a wider range.

Mobile robots are representative examples of the conventional robots. In the conventional mobile robots, a plurality of devices, which really execute desired works, are. provided on a turret which is placed on a support frame. By a rotation of the turret on the support frame, directions of the plurality of devices for works are determined.

For example, a mobile robot with a turret is disclosed in Korean Patent Registration NO. 322316 which was filed by the inventor of the present invention and has been registered. As shown in FIG. 4, in the conventional mobile robot disclosed in Korean Patent Registration NO. 322316, a plurality of wheels 206 are provided under a support frame of the robot to move the mobile robot. The plurality of wheels 206 are connected by first and second belts 201 and 202 to each other. The first belt 201 is wound around both a drive motor 204 and the wheels 206, so that the drive motor 204 rotates the wheels 206 through the first belt 201 to move the mobile robot. Both wheel cases which hold the wheels 206 and a turret shaft 205 are rotated by a steering motor 203 through the second belt 202 to determine a direction of the movement of the mobile robot. At this time, a direction of the turret is equal to the direction of the movement of the mobile robot.

However, in the conventional mobile robot disclosed in NO. 322316, to change the direction of the movement of the turret, the robot must be rotated while the second belt 202 is rotated by the operation of the steering motor 203. The above-mentioned movement of the robot requires excessive power consumption and limits the workspace of the robot.

Furthermore, when the turret is rotated at angles higher than a predetermined reference angle, the first and second belts, which connect the plurality of wheels to each other, and a plurality of wires, coupled between the support frame and the turret, may be undesirably entangled to each other. Thus, the conventional mobile robot disclosed in NO. 322316 is problematic in that the turret must be rotated within a limited angular range.

In an effort to prevent the plurality of wires of the conventional mobile robot from being undesirably entangled to each other while the turret is rotated, robot bases using slip rings were proposed in Korean Patent registration NO. 299622 and U.S. Pat. No. 4,657,104. The slip rings communicate powers and sensor signals between turrets and support frames, so that the robot bases have structures possible to endlessly rotate the turrets. However, the slip ring used in each of the conventional robot bases proposed in No. 299622 and U.S. Pat. No. 4,657, 104 causes undesired electric noise. Furthermore, it is very difficult to send high currents through the slip rings of the conventional robot bases. In addition, in case of using the slip rings for long periods, the slip rings must be worn.

Because the slip rings are expensive, the conventional robot bases using the slip rings are problematic in that the production costs of the robot bases are increased.

In the meantime, a robot base having a structure possible to endlessly rotate a turret without any entanglement of wires is proposed in Korean Patent Application NO. 2002-0025612 which was filed by the inventor of the present invention. As shown in FIG. 5, the robot base disclosed in NO. 2002-0025612 includes a turret 308 and an electric part. The electric part is provided above the turret 308 and has a turret motor 301, a drive motor 303 and a steering motor 302. The robot base further includes a turret gear train 304 through which the turret 308 is rotated by an operation of the turret motor 301, and a drive gear train 306 through which wheels 307, provided under a support frame 309, are driven by an operation of the drive motor 303. The robot base further includes a steering gear train 305 to determine a direction of a movement of the robot base during an operation of the steering motor 302.

The turret gear train 304, the drive gear train 306 and the steering gear train 305 are arranged to form a triple shaft mechanism in that a drive shaft 311 of the drive gear train 306 is provided around a steering shaft 310 of the steering gear train 305. A turret rotating shaft 312 of the turret gear train 304 is provided around the drive shaft 311. The turret gear train 304 transmits a rotational force generated from the turret motor 301 to the turret 308. The drive gear train 306 and the steering gear train 305 transmit rotational forces generated from the drive motor 303 and the steering motor 302 to the wheels 307, respectively. As described above, the conventional robot base disclosed in NO. 2002-0025612 comprising the electric part at an upper part of the turret 308 and a mechanical part at a lower portion of the turret 308 has a structure possible to endlessly rotate the turret 308 through the triple shaft mechanism.

However, in the conventional robot base disclosed in NO. 2002-0025612, the drive motor 303 and the steering motor 302 are rotated along with the turret 308 while the turret 308 is rotated by the operation of the turret motor 301. At this time, the drive motor 303 and the steering motor 302 are connected to the wheels 307 through the drive gear train 306 and the steering gear train 305, respectively. To prevent the above-mentioned changes in the locations of the drive motor 303 and the steering motor 302 from undesirably causing movements of the wheels 307, the drive motor 303 and the steering motor 302 must be appropriately operated in response to the rotation of the turret 308. Therefore, the conventional robot base disclosed in NO. 2002-0025612 is problematic in that its control algorithm is very complicated, and power consumption is undesirably increased.

DISCLOSURE OF THE INVENTION

Accordingly, the present invention has been made keeping in mind the above problems occurring in the prior art, and an object of the present invention is to provide a synchro-drive mobile robot base, which allows a robot to accomplish a 360° endless rotation through a triple shaft mechanism, and has a structure enabling transmission of rotational forces generated from a steering motor and a drive motor, which are provided on a turret with 360° endless rotation capability, to a wheel unit regardless of the rotation of the turret, so that the motors are precisely controlled to increase work efficiency of the robot, and reduce power consumption of the robot.

In order to accomplish the above object, the present invention provides a decoupled synchro-drive mobile robot base, including: a turret having thereon a turret motor to actuate the turret, a drive motor to actuate a wheel, and a steering motor to control a direction of movement of the wheel; a steering unit having a differential gear unit and transmitting an actuating force generated from the steering motor to a wheel case of a wheel unit; a drive unit having another differential gear unit and transmitting an actuating force generated from the drive motor to the wheel of the wheel unit; and a turret rotating unit to transmit an actuating force generated from the turret motor to the turret, wherein a part of the differential gear unit of the drive unit is coupled to the steering unit, while a part of the differential gear unit of the steering unit is coupled to the turret rotating unit, so that the drive motor, the steering motor and the turret motor are decoupled from each other.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
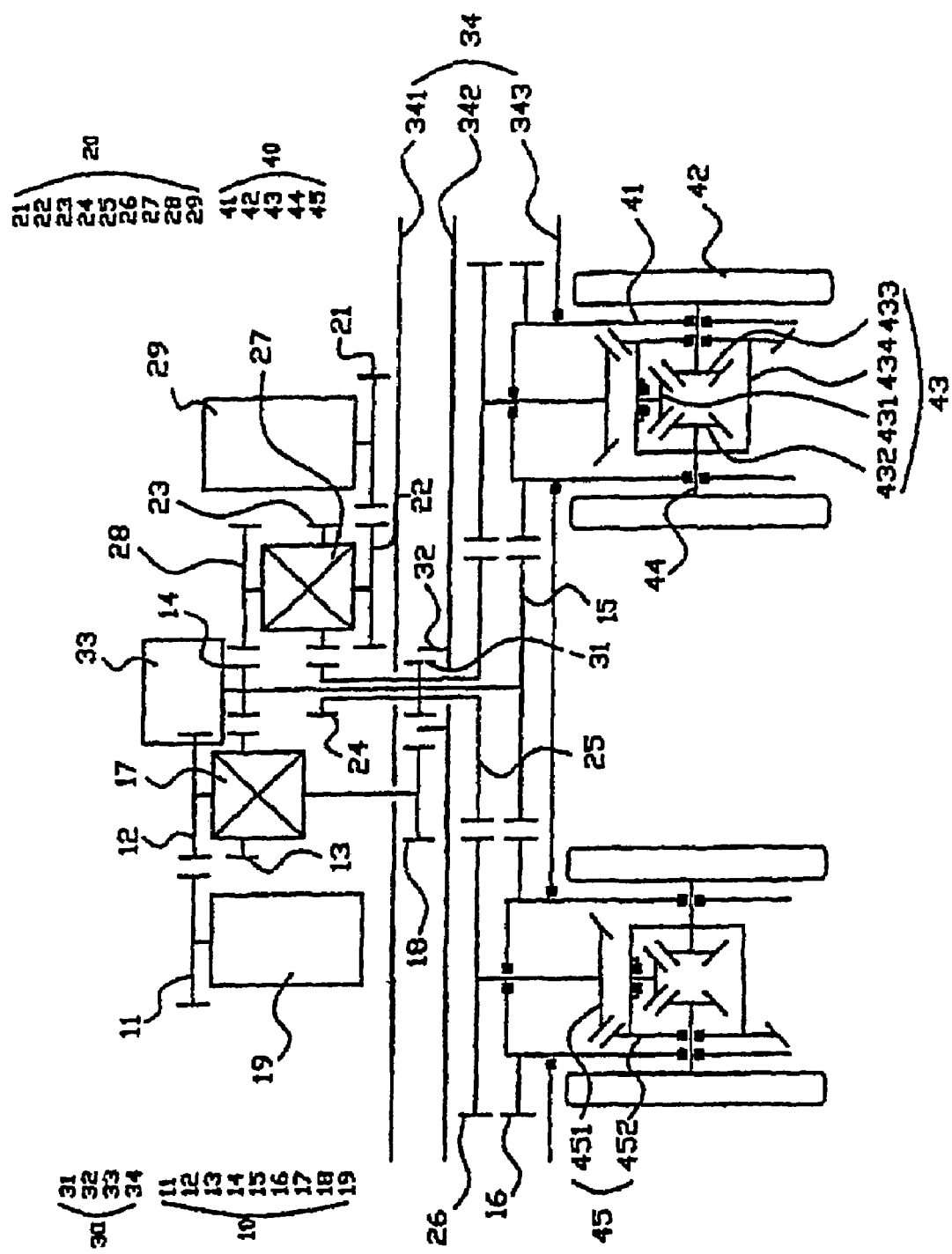
FIG. 1 is a view of a synchro-drive mobile robot base, according to an embodiment of the present invention.

Reference should now be made to the drawings, in which the same reference numerals are used throughout the different drawings to designate the same or similar components.

FIG. 1 is a view of a synchro-drive mobile robot base, according to an embodiment of the present invention. As shown in FIG. 1, the synchro-drive mobile robot base of the present invention includes a steering unit 10 to control the direction of movement of a plurality of wheel units 40, a drive unit 20 to transmit an actuating force to the wheel units 40, and a turret rotating unit 30 to allow a turret having thereon an upper part of a mobile robot to have 360° endless rotation capability. The steering unit 10, the drive unit 20 and the turret rotating unit 30 are connected to each other by a plurality of gears, with two differential gear units provided among the above units. The above-mentioned gears each are set at an appropriate gear ratio such that a drive motor, a steering motor and a turret motor are decoupled from each other.

The steering unit 110 changes a direction of the movement of the robot base by rotating a wheel case 41 of each of the wheel units 40. The steering unit 10 includes a first steering gear 11 which is coupled to an output shaft of the steering motor 19, and a second steering gear 12 which engages with the first steering gear 11. The steering unit 10 further includes a first differential gear unit 17 which is coupled to a rotating shaft of the second steering gear 12, a third steering gear 13 which is provided on a first gear box 174 of the first differential gear unit 17, and a turret connection gear 18 which is coupled to the first differential gear unit 17. The steering unit 10 further includes a fourth steering gear 14 which engages with the third steering gear 13, a fifth steering gear 15 which is provided on a rotating shaft of the fourth steering gear 14, and a sixth steering gear 16 which is provided on an outer surface of each of the wheel cases 41 to engage with the fifth steering gear 15. By the steering unit 10 having the above-mentioned structure, an actuating force generated from the steering motor 19 is transmitted to the wheel cases 41.

Figure 2:
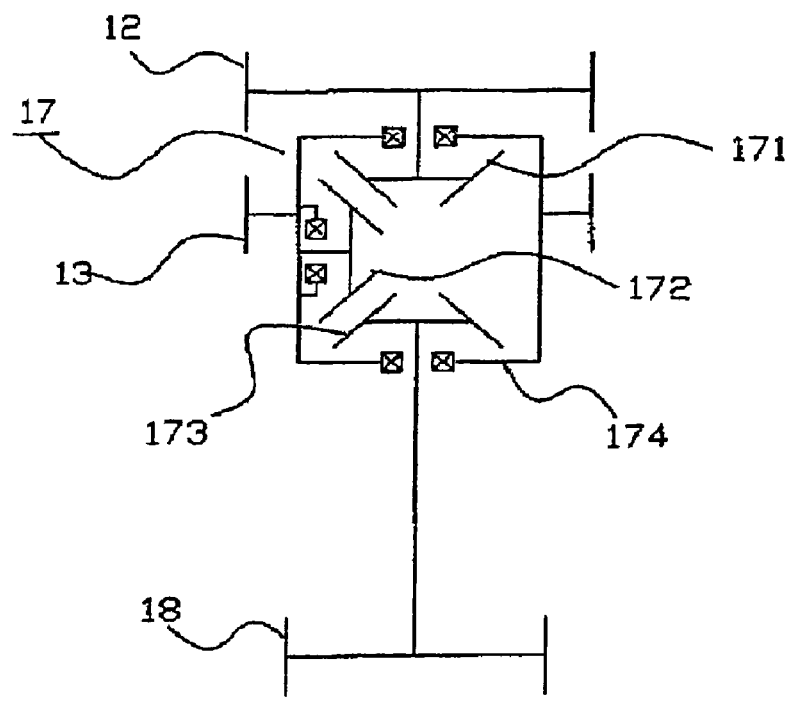
FIG. 2 is a view showing a construction of a first differential gear unit of the mobile robot base according to the present invention.

As shown in FIG. 2, the first differential gear unit 17 includes a steering input gear 171 which is coupled to the rotating shaft of the second steering gear 12, and a steering output gear 172 which is integrally supported on the first gear box 174 by a bearing while engaging with the steering input gear 171. The first differential gear unit 17 further includes a turret output gear 173 which is provided on a rotating shaft of the turret connection gear 18 while engaging with the steering output gear 172.

At this time, the first differential gear unit 17 is set such that the output rotating speed of the third steering gear 13 is ½ times a rotating speed that results from adding the rotating speed of the turret connection gear 18 to the rotating speed of the second steering gear 12 which is rotated by the steering motor 19.

The drive unit 20 actuates a plurality of wheels 42 of each of the wheel units 40. The drive unit 20 includes a first drive gear 21 which is coupled to an output shaft of the drive motor 29, a second drive gear 22 which engages with the first drive gear 21, and a second differential gear unit 27 which is coupled to a rotating shaft of the second drive gear 22. The drive unit 20 further includes a third drive gear 23 which is provided on a second gear box 274 of the second differential gear unit 27, and a steering connection gear 28 which is coupled to the second differential gear unit 27 while engaging with a fourth steering gear 14. The drive unit 20 further includes a fourth drive gear 24 which engages with the third drive gear 23, a fifth drive gear 25 which is provided on a rotating shaft of the fourth drive gear 24, and a sixth drive gear 26 which is provided on an outer surface of each of the wheel units 40 to engage with the fifth drive gear 25.

Figure 3:
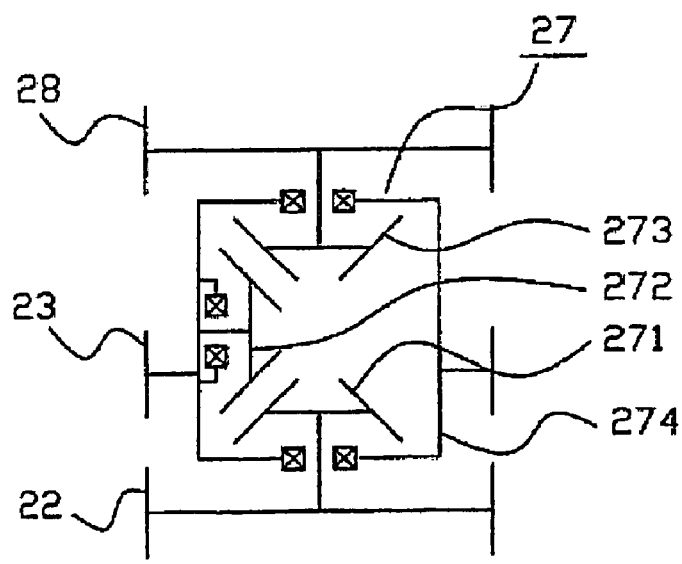
FIG. 3 is a view showing a construction of a second differential gear unit of the mobile robot base according to the present invention.
Figure 4:
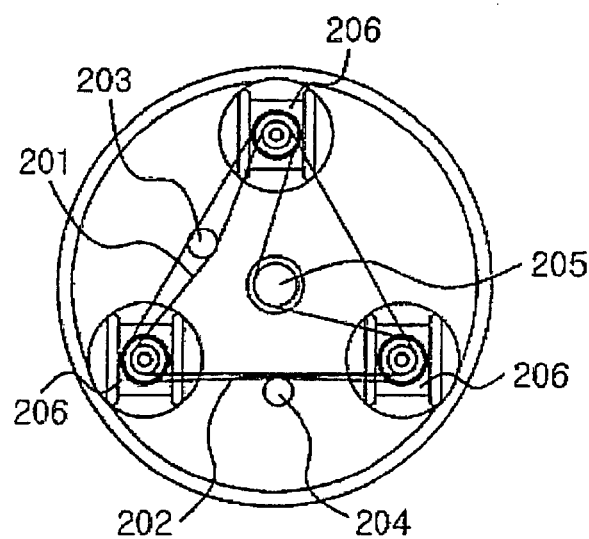
FIG. 4 is a view showing a construction of wheels of a conventional mobile robot base using a belt mechanism.
Figure 5:
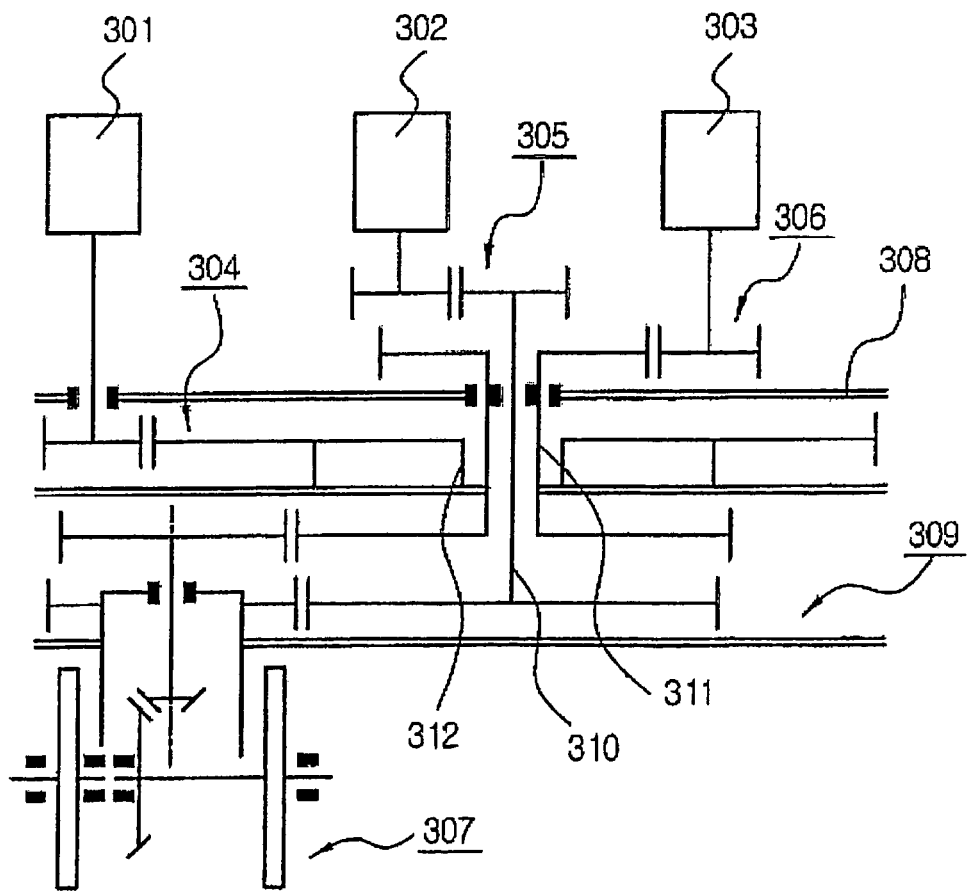
FIG. 5 is a view of another conventional mobile robot base using a gear mechanism.

As shown in FIG. 3, the second differential gear unit 27 includes a drive input gear 271 which is coupled to the rotating shaft of the second drive gear 22, and a drive output gear 272 which is integrally supported on the second gear box 274 by a bearing while engaging with the drive input gear 271. The second differential gear unit 27 further includes a steering. output gear 273 which is provided on a rotating shaft of the steering connection gear 28 while engaging with the drive output gear 272. At this time, in the same manner as the first differential gear unit 17, the second differential gear unit 27 is set such that the output rotating speed of the third drive gear 23 is ½ times a rotating speed that results from adding the rotating speed of the steering connection gear 28 to the rotating speed of the second drive gear 22 which is rotated by the drive motor 29.

The wheel units 40 are operated by the actuating force transmitted through the drive unit 20, the steering unit 10 and the turret rotating-unit 30. The wheel units 40 each includes an actuating bevel gear 45 which is coupled to the sixth drive gear 26 of the drive unit 20 and is supported by a bearing on a rotating wheel shaft 44 having the wheels 42 on both ends thereof. The wheel unit 40 further includes an actuating differential gear unit 43 which is integrally operated in conjunction with the actuating bevel gear 45. The wheel unit 40 further includes the wheel case 41. Both the actuating bevel gear 45 and the actuating differential gear unit 43 are provided in the wheel case 41. The rotating wheel shaft 44 passes through the wheel case 41. The sixth steering gear 16 of the steering unit 10 is integrated with the wheel case 41. Thus, the actuating force generated from the drive motor 29 is transmitted to each of the actuating differential gear units 43, so that the pair of wheels 42 are rotated around the rotating wheel shafts 44 of each of the wheel units 40 by the actuating force transmitted through the actuating differential gear unit 43.

Each of the actuating bevel gears 45 has an input bevel gear 451 which is provided on a rotating shaft of the sixth drive gear 26, and an output bevel gear 452 which is supported on the rotating wheel shaft 44 of the wheel unit 44 to engage with the input bevel gear 451.

Each of the actuating differential gear unit 43 is provided in each of the wheel cases 41 and is integrated with the output bevel gear 452 of the actuating bevel gear 45. The actuating differential gear unit 43 rotates the wheels 42 using the actuating force transmitted from the drive motor 29. The actuating differential gear unit 43 is integrally operated in conjunction with an actuating differential gear case 434 which is integrally provided on the output bevel gear 452 of the actuating bevel gear 45. Each of the actuating differential gear units 43 includes a first gear 431 which is supported on the actuating differential gear case 434 by a bearing, and second and third gears 432 and 433 which are integrally provided on the rotating wheel shaft 44 to engage with the first gear 431.

The turret rotating unit 30 endlessly rotates the turret 341 which has thereon the upper part of the mobile robot. The turret rotating unit 30 includes a first turret gear 31 which is provided on an output shaft of the turret motor 33, and a second turret gear 32 which is provided on a central portion of an upper base plate 342 while engaging with both the first turret gear 31 and the turret connection gear 18. An actuating force generated from the turret motor 33 is transmitted to the turret 341 through the first and second turret gears 31 and 32, so that the turret 341 is rotated.

The turret 341 has the 360° endless rotation capability by the turret rotating unit 30. The steering motor 19, the first steering gear 11, the second steering gear 12, the first differential gear unit 17, the third steering gear 13, the fourth steering gear 14, the drive motor 29, the first drive gear 21, the second drive gear 22, the third drive gear 23, the fourth drive gear 24, the second differential gear unit 27 and the steering connection gear 28 are placed above the turret 341.

The turret connection gear 18, the first turret gear 31 and the second turret gear 32 are placed between the turret 341 and the upper base plate 342. The fifth drive gear 25, the sixth drive gear 26, the fifth steering gear 15 and the sixth steering gear 16 are placed between the upper base plate 342 and the lower base plate 343.

The robot base of the present invention having the above-mentioned construction has a structure in which an outer shaft is provided to couple the fourth drive gear 24 to the fifth drive gear 25 while passing through the second turret gear 32, and an inner shaft to couple a fourth steering gear 14 to the fifth steering gear 15 is arranged in the outer shaft which couples the fourth drive gear 24 to the fifth drive gear 25.

In case that the turret 341 is rotated while the drive motor 29 and the steering motor 19 are stopped, a gear ratio between the following gears is set such that the rotating speed of the second turret gear 32, the rotating speed of the third steering gear 13 and the rotating speed of the third drive gear 23 are equal to each other.

The gear ratios between the gears used in the robot base of the present invention will be described herein below in detail.

On the supposition that a gear ratio between the fifth steering gear 15 and the sixth steering gear 16 is equal to a gear ratio between the fifth drive gear 25 and the sixth drive gear 26, the rotating speed of the second steering gear 12 is designated as $\omega_s$, the rotating speed of the third steering gear 13 is designated as $\omega_{so}$, the rotating speed of the fourth steering gear 14 is designated as $\omega_{sc}$, the rotating speed of the turret connection gear 18 is designated as $\omega_{ts}$, the rotating speed of the second drive gear 22 is designated as $\omega_d$, the rotating speed of the third drive gear 23 is designated as $\omega_{do}$, the rotating speed of the fourth drive gear 24 is designated as $\omega_{dc}$, the rotating speed of the steering connection gear 28 is designated as $\omega_{dst}$, the rotating speed of the second turret gear 32 is designated as $\omega_t$, the rotating speed of the turret connection gear 18/the rotating speed of the second turret gear 32 is designated as $n_1$, the rotating speed of the fourth steering gear 14/the rotating speed of the third steering gear 13 is designated as $n_2$, the rotating speed of the fourth steering gear 14/the rotating speed of the steering connection gear 28 is designated as $n_3$, and the rotating speed of the fourth drive gear 24/the rotating speed of the third drive gear 23 is designated as $n_4$, If only the turret motor 33 is operated, $$\omega_{ts} = n_1 \omega_t$$

$$\omega_{so} = (\omega_s + \omega_{ts})/2 = (\omega_s + n_1\omega_t)/2 \text{ is obtained.}$$

Because $\omega_{sc} = n_2 \omega_{so}$, $$\omega_{sc} = n2\{(\omega_s + n_1\omega_t)/2\} \text{ is obtained.}$$

When the turret 341 is rotated, the drive motor 29 and the steering motor 19, which are provided above the turret 341, are rotated along with the turret 341 around a rotating axis of the turret 341, so that positions of the drive motor 29 and the steering motor 19 are changed. At this time, both the drive motor 29 and the steering motor 19 are connected to each of the wheel units 40 through the plurality of drive gears and the plurality of steering gears. Therefore, to prevent the changes of the positions of the drive motor 29 and the steering motor 19 from being applied to the wheel units 40, a rotation of each of both the drive gears and the steering gears must be equal to that of the rotation of the turret 341. Thus, the steering unit 10 and the turret 341, or the steering unit 10 and the drive unit 20 are decoupled from each other.

That is, when the rotating speed $\omega_{sc}$ of the fourth steering gear 14 is equal to the rotating speed $\omega_t$ of the second turret gear 32, the steering unit 10 and the turret 341 are decoupled from each other. In this case, the following relation is obtained.

$$\omega_{sc} = n2\{(\omega_s + n_1\omega_t)/2\} = \omega_t \text{ is obtained. Since } \omega_s = 0,$$
$$n_1 n_2 = 2 \text{ is obtained.}$$

In the meantime, when only the steering motor 19 is operated, $$\omega_{dst} = n_3 \omega_{sc} = n_2 n_3 \{(\omega_s + n_1 \omega_t)/2\}$$

$$\omega_{do} = (\omega_{ds} + \omega_d) = [n_2 n_3\{(\omega_s + n_1\omega_t)/2\} + \omega_d]/2$$

$$\omega_{dc} = n_4 \omega_{do} = n_4[n_2 n_3\{(\omega_s + n_1\omega_t)/2\} + \omega_d]/2 \text{ are obtained.}$$

That is, when the rotating speed $\omega_{sc}$ of the fourth steering gear 14 is equal to the rotating speed $\omega_{dc}$ of the fourth drive gear 24, the steering unit 10 and the drive unit 20 are decoupled from each other. In this case, the following relation is obtained.

$$\omega_{dc}=n_4\omega_{do}=n_4[n_2n_3\{(\omega_s+n_1\omega_t)/2\}+\omega_d]/2=\omega_{sc} \text{ is obtained. Since } \omega_d=0, \text{ and } \omega_t=0,$$

$n_3n_4=2$ is obtained.

In the meantime, in case that only the drive motor 29 is operated, $\omega_s=0$, and $\omega^d=0$ are obtained. Because $\omega_{dc}=\omega_t$, $n_1n_2n_3n_4=4$ is obtained and is dependent on the above-mentioned conditions.

To decouple the drive unit 20, the turret 341 and the steering unit 10 from each other, the gear ratio between the following gears is set such that the rotating speed of the second turret gear 32, the rotating speed of the third steering gear 13 and the rotating speed of the third drive gear 23 are equal to each other.

The number of teeth of each gears, which is denoted by the reference character Z, is obtained from the following relation to satisfy conditions of the decoupling relations of the units and radii of the gears.

$$n_1=\omega_{ts}/\omega_t=Z_t/Z_{ts}=64/32=2$$

$$n_2=\omega_{sc}/\omega_{so}=Z_{sc}/Z_{sc}=48/48=1$$

$$n_3=\omega_{dst}/\omega_{sc}=Z_{sc}/Z_{dst}=48/48=1$$

$$n_4=\omega_{dc}/\omega_{do}=Z_{dd}/Z_{dc}=64/32=2$$

That is, in case that the number of teeth of the second turret gear 32, the number of teeth of the third steering gear 13, the number of teeth of the fourth steering gear 14, the number of teeth of the turret connection gear 18, the number of teeth of the steering connection gear 28, the number of teeth of the third drive gear 23, and the number of teeth of the fourth drive gear 24 are set as the above equations, the decoupling relations between the turret 341 and the steering unit 10, between the steering unit 10 and the drive unit 20, and between the drive unit 20 and the turret 341 are accomplished.

When the number of teeth of each of the gears is set as the above equations, in case that the turret 341 is rotated while both the drive motor 29 and the steering motor 19 are stopped, the drive unit 20 and the first differential gear unit 17 are rotated around a steering center gear (the fourth steering gear 14). The rotating speeds of the gears are increased by 2 times through the relation $n_1$, are reduced by ½ times through the first differential gear unit 17, and are maintained as the same speeds through the relation $n_2$. Therefore, the rotating speed of the second steering gear 12 of the first different gear unit 17 is equal to that of the turret 341. Thus, the turret 341 and the steering unit 10 are decoupled from each other. Furthermore, the rotating speeds of the gears are maintained as the same speeds through the relation $n_3$, are reduced by ½ times through the second differential gear unit 27, and are increased by 2 times through the relation $n_4$. Therefore, the rotating speed of the third drive gear 23 of the second differential gear unit 27 is also equal to that of the turret 341. Thus, during the rotation of the turret 341, the decoupling relation between the steering unit 10 and the drive unit 20 is accomplished.

When the turret 341 and the drive motor 29 are not operated, in case that the steering motor 19 is operated, the third steering gear 13 of the first differential gear unit 17 is rotated. Thus, the fourth, fifth and sixth steering gears are rotated to rotate the wheel cases 41. Furthermore, the third drive gear 23 of the second differential gear unit 27, which engages with the steering center gear (the fourth steering gear 14), is further rotated to actuate the wheels 42. At this time, the rotating speed of the third steering gear 13 is maintained as the same speed through the relation $n_3$, is reduced by ½ times through the second differential gear unit 27, and is increased by 2 times through the relation $n_4$. Therefore, the rotating speed of the third drive gear 23 is equal to the rotating speed of the third steering gear 13. Thus, the relative speed between the steering unit 10 and the drive unit 20 is zero, so that the decoupling relation is accomplished.

In the robot base of the present invention having the above-mentioned structure, during the operation of the turret motor, the actuating force generated from the turret motor is transmitted to the second turret gear to rotate the turret. Simultaneously, the actuating force is transmitted to the wheel cases through the turret connection gear, the third, fourth, fifth and sixth steering gears to change the direction of the movement of the wheel units. In addition, the actuating force is transmitted to the wheels of the wheel units through the turret connection gear, the third steering gear, the fourth steering gear, steering connection gear, the third, fourth, fifth and sixth drive gears, thus rotating the wheels.

Furthermore, when the steering motor is operated, the actuating force generated from the steering motor is transmitted to the wheel cases through the first, second, third, fourth, fifth and sixth steering gears to change the direction of the movement of the wheel units, and simultaneously, is transmitted to the wheel units through the turret connection gear, the third steering gear, the fourth steering gear, the steering connection gear, the third, fourth, fifth and sixth drive gears to rotate the wheels.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, the present invention provides a synchro-drive mobile robot base, in which coupling relations, caused during a rotation of turret and a steering, is eliminated by adjusting differential gears and a gear ratio, so that the mobile robot base is precisely controlled using actuating forces generated from a turret motor, a steering motor and a drive motor, thus reducing power consumption of the robot base.

Furthermore, in the robot base of the present invention, a steering unit and a drive unit are coupled to each other through a triple shaft mechanism. Accordingly, a 360° endless rotation of the turret is accomplished.

The invention claimed is:

1. A decoupled synchro-drive mobile robot base, comprising: a turret having thereon a turret motor to actuate the turret, a drive motor to actuate a wheel, and a steering motor to control a direction of movement of the wheel; a steering unit comprising a differential gear unit and transmitting an actuating force generated from the steering motor to a wheel case of a wheel unit; a drive unit comprising another differential gear unit and transmitting an actuating force generated from the drive motor to the wheel of the wheel unit; and a turret rotating unit to transmit an actuating force generated from the turret motor to the turret, wherein a part of the differential gear unit of the drive unit is coupled to the steering unit, while a part of the differential gear unit of the steering unit is coupled to the turret rotating unit, so that the drive motor, the steering motor and the turret motor are decoupled from each other, wherein the wheel unit comprises an actuating bevel gear coupled to the drive unit and supported by a bearing on a rotating wheel shaft having wheels on both ends thereof, and an actuating differential gear unit integrally operated in conjunction with the actuating bevel gear; with both the actuating bevel gear and the actuating differential gear unit being provided in the wheel case, the rotating wheel shaft passing through the wheel case, and a steering gear of the steering unit being integrated with the wheel case.

2. The decoupled synchro-drive mobile robot base according to claim 1, wherein the steering unit comprises a first steering gear coupled to an output shaft of the steering motor; a second steering gear to engage with the first steering gear; a first differential gear unit coupled to a rotating shaft of the second steering gear; a third steering gear provided on a first gear box of the first differential gear unit; a turret connection gear coupled to the first differential gear unit; a fourth steering gear to engage with the third steering gear; a fifth steering gear provided on a rotating shaft of the fourth steering gear; and a sixth steering gear provided on an outer surface of the wheel case to engage with the fifth steering gear.

3. The decoupled synchro-drive mobile robot base according to claim 2, wherein the first differential gear unit comprises a steering input gear coupled to the rotating shaft of the second steering gear; a steering output gear supported on the first gear box by a bearing while engaging with the steering input gear; and a turret output gear provided on a rotating shaft of the turret connection gear while engaging with the steering output gear.

4. The decoupled synchro-drive mobile robot base according to claim 1, wherein the drive unit comprises a first drive gear coupled to an output shaft of the drive motor; a second drive gear to engage with the first drive gear; a second differential gear unit coupled to a rotating shaft of the second drive gear; a third drive gear provided on a second gear box of the second differential gear unit; a steering connection gear coupled to the second differential gear unit while engaging with a fourth steering gear; a fourth drive gear to engage with the third drive gear; a fifth drive gear provided on a rotating shaft of the fourth drive gear; and a sixth drive gear provided on an outer surface of the wheel unit to engage with the fifth drive gear.

5. The decoupled synchro-drive mobile robot base according to claim 4, wherein the second differential gear unit comprises a drive input gear coupled to the rotating shaft of the second drive gear; a drive output gear supported on the second gear box by a bearing while engaging with the drive input gear; and a steering output gear provided on a rotating shaft of the steering connection gear while engaging with the drive output gear.

6. The decoupled synchro-drive mobile robot base according to claim 1, wherein the turret rotating unit comprises a first turret gear provided on an output shaft of the turret motor; and a second turret gear provided on a central portion of an upper base plate while engaging with both the first turret gear and the turret connection gear.

7. The decoupled synchro-drive mobile robot base according to claim 2 or 3, wherein a gear ratio between the fifth steering gear and the sixth steering gear is equal to that of the fifth drive gear and the sixth drive gear.

8. The decoupled synchro-drive mobile robot base according to any one of claims 2, 4 and 6, wherein, on the supposition that the number of teeth of the first turret gear/the number of teeth of the turret connection gear is designated as $n_1$, the number of teeth of the third steering gear/the number of teeth of fourth the steering gear is designated as $n_2$, the number of teeth of the fourth steering gear/the number of teeth of the steering connection gear is designated as $n_3$, and the number of teeth of the third drive gear/the number of teeth of the fourth drive gear is designated as $n_4$, each gear ratio is set as $n_1 n_2 = 2$, and $n_3 n_4 = 2$, so that the drive motor, the steering motor and the turret motor are decoupled from each other.

* * * * *